(12) United States Patent
Liu et al.

(10) Patent No.: US 6,259,314 B1
(45) Date of Patent: Jul. 10, 2001

(54) BUILT-IN SELF TEST FOR A SATELLITE DEMODULATOR

(75) Inventors: Sam H. Liu, Los Angeles; Edward L. Niu, Redondo Beach; Vincent C. Moretti, Torrance, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/249,908

(22) Filed: Feb. 12, 1999

(51) Int. Cl.[7] .................................................. H04B 17/00
(52) U.S. Cl. ...................... 329/304; 329/306; 375/224; 375/228; 455/67.4; 455/330; 455/226.1
(58) Field of Search ................................. 375/224, 225, 375/226, 227, 228; 329/304, 306; 455/226.1, 67.04, 330

(56) References Cited

U.S. PATENT DOCUMENTS 6,081,700 * 7/2000 Salvi et al. ......................... 455/193.3

* cited by examiner

*Primary Examiner*—Arnold Kinkead
(74) *Attorney, Agent, or Firm*—Robert W. Keller

(57) ABSTRACT

The invention is a demodulator (50, 100) and a method of data reception and testing of a demodulator. A demodulator in accordance with the invention includes an input signal source (52, 102) having an output which during data reception is a data signal and which during testing of the demodulator is a reference signal; a tuner (54, 101) having a tuner input coupled to the output of the input signal source and a tuner output, the tuner including a frequency converter (20, 36) which frequency shifts the data signal to a lower carrier frequency during data reception to cause the tuner to output at the tuner output the lower carrier frequency modulated with the data signal and which upwardly frequency shifts the reference signal to a test carrier frequency during the testing; and a test data source (56, 105) which applies a test data signal to the tuner during the testing to cause the tuner to output at the tuner output the test carrier frequency modulated with the test data signal.

37 Claims, 4 Drawing Sheets

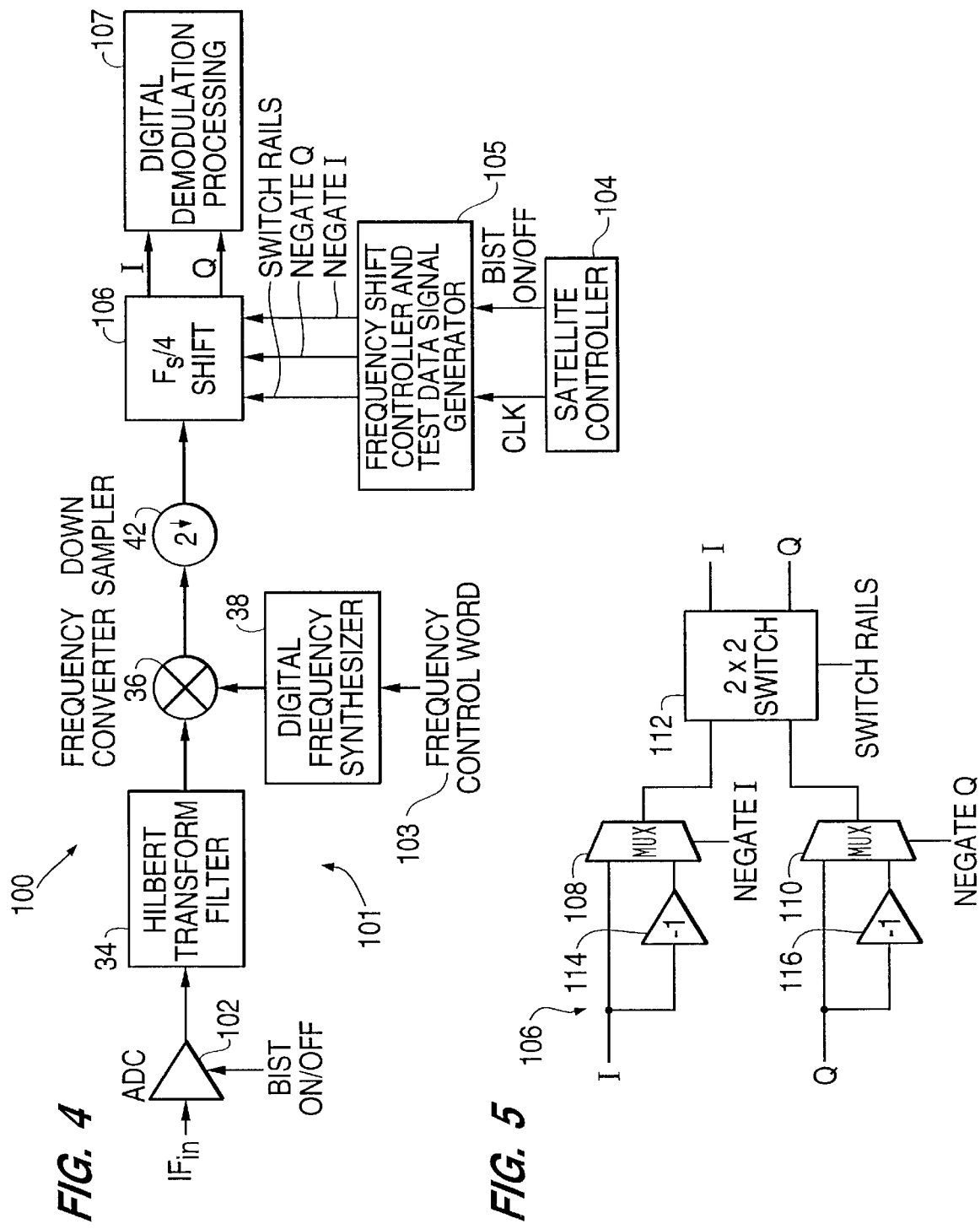

BUILT-IN SELF TEST FOR A SATELLITE DEMODULATOR

STATEMENT REGARDING FEDERALLY SPONSORED DEVELOPMENT

This invention was made with U.S. Government support under Contract No. F04701-97-C-0025 awarded by the United States Air Force Space & Missiles Command. The U.S. Government has certain rights in this invention.

BACKGROUND OF THE INVENTION

1. Field of the Invention

The present invention relates to testing of demodulators in data reception systems and, more particularly, to built-in testing of data demodulators in satellites independent of uplink characteristics.

2. Description of the Prior Art

Satellite data transmission systems are in wide spread usage. These systems suffer from an inability to determine the source of malfunctions within the data transmission uplink. While an erroneous data stream can be detected with a retransmission from a satellite which indicates a malfunction in the uplink, it is very difficult to determine the source of the malfunction from the ground in view of the inaccessibility of the satellite electronics for testing. Currently, determination of the source of a malfunction requires backtracking from the detection of erroneous data in a retransmission from the satellite with there being no current methodology by which the satellite onboard electronics in the data demodulator can be tested conveniently from the ground to determine if malfunctions exist in the demodulator.

FIG. 1 illustrates a block diagram of a conventional demodulator 10 of the type used in data transmission satellites. The demodulator 10 receives an input signal $IF_{in}$ which has been shifted down in frequency by the satellite to an intermediate frequency. The input signal $IF_{in}$ containing data is applied to an analog to digital converter 12 which digitizes the input signal $IF_{in}$ into an output containing a large number of samples which are inputted to a tuner 14. The tuner 14 processes the digitized data outputted by the analog to digital converter 12 into quadrature signal processing paths 16 and 18 which each contain a frequency converter 20 which downwardly shifts the input signal $IF_{in}$ to a lower frequency. The frequency converters 20 of the I signal processing path 16 and the Q signal processing path 18 respectively receive input carriers $COS(\omega T)$ and $SIN(\omega T)$ from the quadrature digital sinewave generator which cause the frequency converters to produce the quadrature I and Q signals which were downshifted in frequency to a lower carrier frequency. The input to the quadrature digital sinewave generator 22 is a frequency command $F_{in}$ which commands the quadrature digital sinewave generator 22 to output the quadrature carriers $COS(\omega T)$ and $SIN(\omega T)$ of the appropriate frequency to cause the frequency converters to shift the input signal $IF_{in}$ to the lower carrier frequency for further signal processing. The envelopes of the lower frequency quadrature carriers produced by connection of COS ($\omega T$) and $SIN(\omega T)$ to the frequency converters 20 are modulated with the quadrature components of data present in the intermediate frequency input signal $IF_{in}$. The outputs from the frequency converters 20 are applied to suitable low pass filters 24 which attenuate frequency components outside the desired lower carrier frequency band to which the I and Q data components are shifted. The output I and Q signals are applied to downstream demodulator processing 26 of a conventional nature including channelization, discrete Fourier transformation (DFT) and other known signal processing techniques.

As has been stated above, a demodulator, including a tuner 14 in accordance with the prior art of FIG. 1, is not readily diagnosed for malfunctions occurring downstream of the tuner. This seriously affects the ability to locate where processing errors occur when the output transmissions of a data satellite contains erroneous data.

FIG. 2 illustrates a block diagram of a preferred embodiment of a demodulator containing a digital tuner 30 of the type used with the practice of the present invention. It should be understood that separate I and Q channels are present in FIG. 2 but have been omitted to simplify the illustration. The digital tuner 30 receives an intermediate frequency data input $IF_{in}$ like that of FIG. 1 which is applied to an analog to digital converter 32 which performs the same function as the analog to digital converter of FIG. 1 to sample the data into a large number of data samples. The output of the analog to digital converter 32 contains an extremely high number of samples which are applied as an input to a Hilbert transform filter 34 of well-known construction. The Hilbert transform filter 34 performs two tasks which are to convert a real data input into a complex data output having real and imaginary components and to further greatly attenuate half of the wideband digital spectrum of the incoming digital signal. The output of the Hilbert transform filter 34 is applied to a frequency converter 36 which shifts the intermediate frequency input data after filtering by the Hilbert transform filter 34 to a lower carrier frequency. The inputting of digitally synthesized quadrature sinewaves from a digital frequency synthesizer 38 to the frequency converter 36 downwardly shifts the data in the same manner as described above in conjunction with FIG. 1. The particular specified frequency down to which the data outputted from the Hilbert transfer filter 34 is shifted is specified by the input FREQUENCY CONTROL WORD 40. As a consequence of the filtering function performed by the Hilbert transform filter 34 eliminating at least half the digital data bandwidth and by the frequency converter 36 downshifting the filtered data, the output from the frequency converter is applied to a down sampler 42 which eliminates the excess half of the data samples. The output of the down sampler is applied to a frequency shift 44 which shifts up the frequency of the output from the down sampler 42 by a frequency shift equal to one quarter of data sampling rate $F_s$. A frequency shift controller 45 produces control signals SWITCH RAILS, NEGATE Q and NEGATE I which operate in accordance with the relationship set forth in the table below to produce a cyclical output of +1, +j, −1 and −j which is clocked at the data sampling rate $F_s$. The circuitry for generating the control signals is discussed below in conjunction with FIG. 5.

| Multiplier | Control Signals |
|---|---|
| +1 | do not negate, nor swap rails |
| +j | negate Q-rail, swap rails (i.e. I and Q are switched) |
| −1 | negate both rails, do not swap rails |
| −j | negate I-rail, swap rails |

The frequency shift 44 outputs I and Q data signals which are shifted to a correct frequency position to align the I and Q data in frequency with channels to be produced by a channelizer within digital demodulator processing 46 in a manner like FIG. 1.

For spectral efficiency and to prevent aliasing due to the down sampler 42, the digital spectrum produced by the frequency conversion 36 has channels positively and negatively spaced about baseband but does not have a channel at baseband. A channelizer requires alignment of the input data with a channel centered at baseband in order to function properly. The frequency shift 44 performs a frequency shift equal to one quarter of the data sampling rate $F_s$ where $F_s$ is the data sample rate of data outputted from the down sampler 42.

The demodulator containing the digital tuner 30 of FIG. 2, like the demodulator 10 of FIG. 1, suffers from not being readily testable for malfunctions of the demodulator signal processing downstream of the tuner from a remote location.

SUMMARY OF THE INVENTION

The present invention is a demodulator and a method of data reception and testing of a demodulator which permits remote testing of a demodulator in a data receiving device such as, but not limited to, a satellite. The invention permits testing of demodulator electronics independent of data input characteristics, such as uplink and downlink characteristics, in the satellite. The invention provides built-in self-testing of a demodulator by utilizing a locally generated test signal which is modulated at the tuner from baseband onto a carrier frequency which is injected at the tuner. The test signal output from the tuner is demodulated and compared with the test data signal which was used to modulate the carrier frequency at the tuner to determine if a difference exists, indicating a malfunction in the demodulator. As a result, the remainder of the demodulator downstream from the tuner processes the test data signal as if it were transmitted from the ground or from the satellite to validate the individual components of the demodulator processing performed downstream of the tuner. After testing is completed, the built-in test signal generator is disabled from modulating a test carrier frequency with the test data signal which returns the tuner of the demodulator to its normal operation for receiving data.

The present invention performs built-in self-testing without the requirement of substantial additional hardware. Known tuner designs utilized for demodulating or modulating data are modified to include the capability of generating the test carrier frequency which is modulated with the test data signal and injected in the data signal processing paths at the tuner for subsequent decoding and comparison to determine if the aforementioned difference exists indicating a malfunction of the tuner.

While a preferred embodiment of the present invention utilizes quadrature modulation permitting the encoding of four complex data signal states (1, +j, −1, −j), the invention is not limited thereto and may be utilized in any M-ary signaling protocol. The present invention is utilizable with tuners of the diverse design.

The generation of the test carrier frequency modulated with the test data signal at the tuner may be produced in a number of ways. The frequency converter of the tuner, which normally functions to shift down the frequency of the received data signal to a lower carrier signal frequency, may be commanded to produce an upward frequency shift of the test data signal from baseband to a test carrier frequency to directly produce the test carrier frequency modulated with the test data signal. The resultant test carrier frequency modulated with the test data signal is processed downstream as if data is being received by normal data transmission in order to determine if components in the demodulator are malfunctioning. Alternatively, the test data signal may be used to modulate the test carrier frequency downstream of the frequency conversion with a DC level modulating the test carrier frequency at the frequency converter. The test data signal may be generated by a test signal generator which applies control signals to a frequency shift which receives the test carrier frequency which has been modulated with the DC level. The timed application of the control signals to the frequency shift permits the generation of I and Q signals having the aforementioned programmable values of 1, +j, −1, −j, which are clocked at the symbol rate instead of the data sample rate after down sampling as in the prior art. In this application, the shift is a phase shift of the test carrier frequency which may be 0°, 90°, 180° or 270°.

A demodulator in accordance with the invention includes an input signal source having an output which during data reception is a data signal and which during testing of the demodulator is a reference signal; a tuner having a tuner input coupled to the output of the input signal source and a tuner output, the tuner including a frequency converter which shifts the data signal to a lower carrier frequency during data reception to cause the tuner to output at the tuner output the lower carrier frequency modulated with the data signal and which upwardly frequency shifts the reference signal to a test carrier frequency during the testing of the demodulator; and a test data source which applies a test data signal to the tuner during the testing to cause the tuner to output at the tuner output the test carrier frequency modulated with the test data signal. The input signal source is an analog to digital converter, the analog to digital converter producing the reference signal at the output of the input signal source which is a DC signal in response to a test command and producing a digitized output of the data signal when the test command is not present at the analog to digital converter. The test data signal is coupled to the frequency converter to produce the test carrier frequency modulated with the test data signal. A quadrature digital sinewave generator, coupled to the frequency converter, is responsive to a frequency command to cause the frequency converter during data reception to produce I and Q quadrature carriers at a commanded lower carrier frequency and to cause the frequency converter during testing of the demodulator to produce commanded I and Q quadrature carriers at the test carrier frequency; and wherein the test data source is coupled to the quadrature sinewave generator with the quadrature carriers at the test carrier frequency being modulated with the test data signal to produce I and Q test data signals. A phase generator, coupled to the test data source, outputs a phase signal to the quadrature digital sinewave generator, producing a plurality of discrete phases which are programmable with the programmable phases encoding signal states of the I and Q test data signals which are stored by the test data source and modulated on the test carrier frequency. A clock signal generator outputs to the test data source a clock signal at a data symbol rate of the I and Q data signals to control a rate at which states of the test data signal are generated; and wherein the phase signal is a baseband phase signal.

A digital frequency synthesizer is coupled to the frequency converter, which is responsive to a frequency command, to cause the frequency converter to produce a digitally synthesized lower carrier frequency and a digitally synthesized test carrier frequency; and wherein the test signal generator modulates a signal, which is coupled to an output of the frequency converter, with the test signal to produce the output of the test carrier frequency modulated with the test data signal. A frequency shift is coupled to the output of the frequency converter which, in response to the test data signal, shifts the signal coupled to the output of the frequency converter in phase but not in frequency to produce a phase shifted output at the output of the tuner with the phase shifted output being modulated by discrete phases with each phase representing one of an I or Q signal states of the test data signal during testing. The frequency shift produced by the frequency shift is one quarter of a data sampling rate of data inputted to the frequency shifter during data reception and modulates the test carrier frequency in phase at a data symbol rate of I and Q data when the test data signal is inputted to the frequency shift. A filter is provided having a filter input coupled to the output of the input signal source, and a filter output coupled to the frequency converter, the filter attenuating half of a spectrum of the data signal and converting real data of the output of the input signal source into complex data having real and imaginary components; and a down sampler having a down sampler input coupled to an output of the frequency converter and an output, coupled to the frequency shift, the down sampler signal reducing a number of samples in the data signal by a factor of two which are contained in the output of the frequency converter. The demodulator is located in a satellite. A processing device, coupled to the output of the tuner, compares a demodulated test data signal with the test data signal which modulated the test carrier frequency with a difference between the demodulated test signal and the test data signal indicating a malfunction in the demodulator.

A method of data reception and testing of a demodulator in accordance with the invention includes providing an input signal which is a data signal during the data reception and is a reference signal during the testing of the demodulator; operating a frequency converter within a tuner of the demodulator to convert in frequency the data signal to a lower carrier frequency during data reception and to frequency shift the reference signal upwardly to a test carrier frequency during testing of the demodulator; and applying a test data signal to the tuner during testing to cause the tuner to output the test carrier frequency modulated with the test data signal. The reference signal is a DC signal which is produced in response to a test command applied to an analog to digital converter which is coupled to an input of the tuner; and the analog to digital converter produces a digitized output of the data signal which is applied to an input of the tuner during reception of the data signal. The test data signal is coupled to the frequency converter to produce the test carrier frequency modulated with the test signal. A quadrature digital sinewave generator is coupled to the frequency converter and is responsive to frequency commands to cause the frequency converter to produce I and Q quadrature carriers at the lower carrier frequency which are modulated with data signals and to cause the frequency converter to produce commanded I and Q quadrature carriers at the test carrier frequency which are modulated with the test data signal. A phase signal having a plurality of discrete phases which are programmable with the phases representing signal states of the I and Q test data signals is coupled to the quadrature digital sinewave generator. A clock signal is produced at a data symbol rate of the I and Q data signals; and changing of the phase signal is controlled to be synchronous with the clock signal; and wherein the phase signal is a baseband signal.

A digitally synthesized test carrier frequency is coupled to the frequency converter; and a signal, which is coupled to an output of the frequency converter, is modulated with the test data signal frequency to produce the test carrier frequency modulated with the test data signal. The signal coupled to the output of the frequency converter is shifted in phase but not in frequency to produce a phase shifted output at an output of the tuner with the phase shifted output being modulated with discrete phases with each phase representing one of an I or Q signal state of the test data signal during testing. The phases are selected from 0°, 90°, 180° and 270° phases of the test carrier frequency when the test data signal is outputted from the tuner. Half of a data spectrum of the data signal is attenuated and real data of the data spectrum is converted into complex data having a real and an imaginary component which is coupled to an input of the frequency converter; an output of the frequency converter is down sampled by a factor of two to produce a down sampled output; and the down sampled output is phase shifted during testing. A digitally synthesized test carrier frequency is coupled to the frequency converter; and a signal, which is coupled to an output of the frequency converter, is modulated with the test data signal to produce the test carrier frequency modulated with the test data signal. A demodulated test data signal is compared with the test data signal used to modulate the test carrier frequency with a difference between the demodulated test signal and the test data signal indicating a malfunction in the demodulator.

BRIEF DESCRIPTION OF THE DRAWING

FIG. 4 illustrates a block diagram of a second embodiment of a digital demodulator in accordance with the present invention.

FIG. 5 illustrates a block diagram of a frequency shift used in FIG. 2 and in the second embodiment of FIG. 4.

Like reference numerals identify like parts throughout the drawings.

DESCRIPTION OF THE PREFERRED EMBODIMENTS

Figure 3:
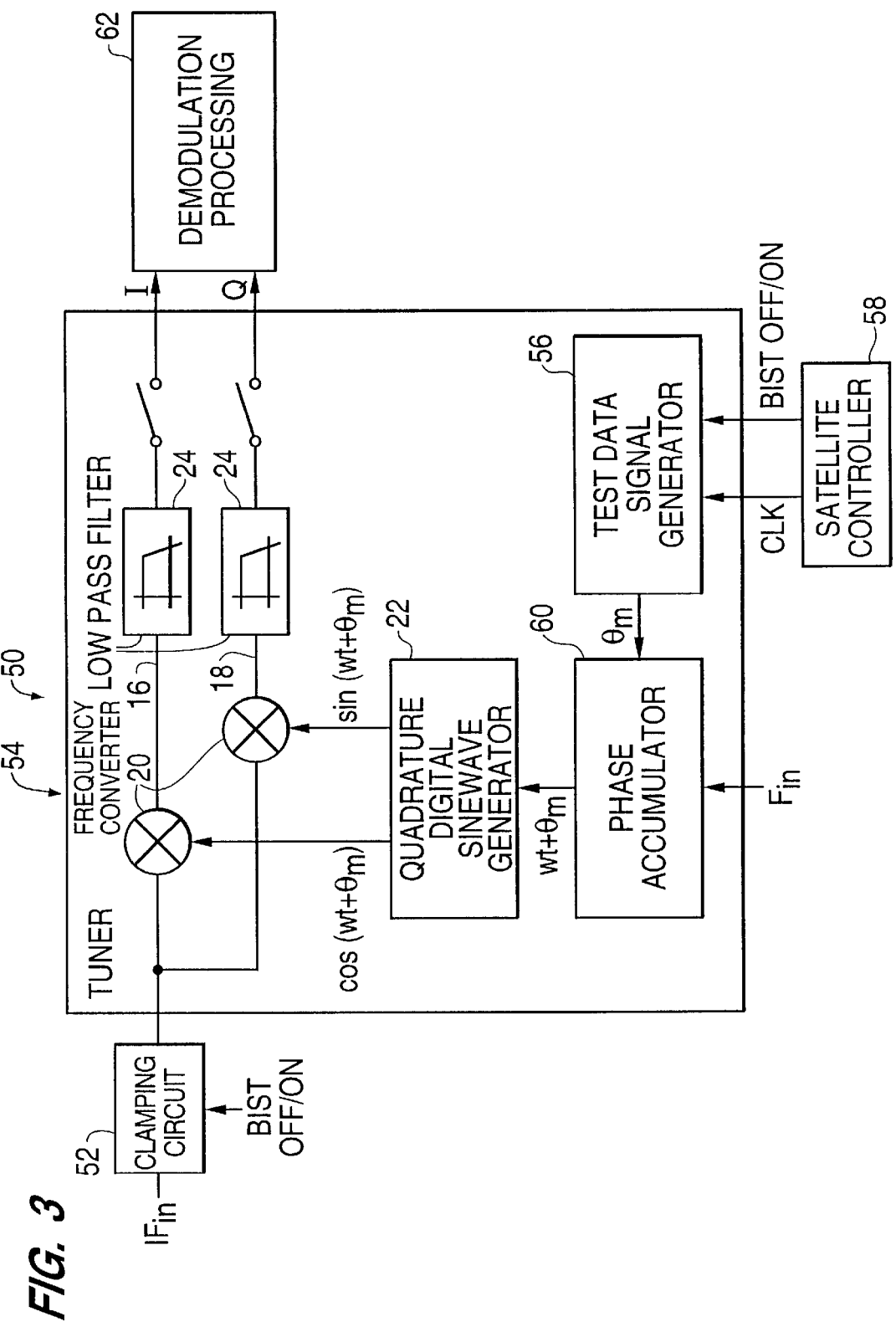
FIG. 3 illustrates a block diagram of a first embodiment of a demodulator in accordance with the present invention.

First and second embodiments of the invention are illustrated respectively in FIGS. 3 and 4 and 5. Each of the embodiments, while utilizing a different tuner architecture, generates a test signal with a test data source which is used to modulate a test carrier frequency. The test carrier frequency modulated with the test data signal is injected at the tuner at different parts of the data signal processing paths in the first and second embodiments. Preferably, while the invention is not limited thereto, a pair of I and Q quadrature data signal processing paths are used. The invention upwardly shifts the test data signal in frequency, which originates at baseband, to the test carrier frequency which is modulated with the test data signal. The test carrier frequency is generated by the tuner in response to a frequency command.

Regardless of where the test carrier frequency is modulated with the test data signal in the tuner, the resultant modulated test data signal is processed by a downstream demodulator processor or processing devices to compare the demodulated test data signal with the test data signal which was used to modulate the test carrier frequency. A difference between the test data signal which modulated the test carrier frequency and demodulated test carrier frequency indicates a malfunction in the demodulator downstream from the point of injection of the test carrier frequency modulated with the test data signal in the tuner.

Figure 1:
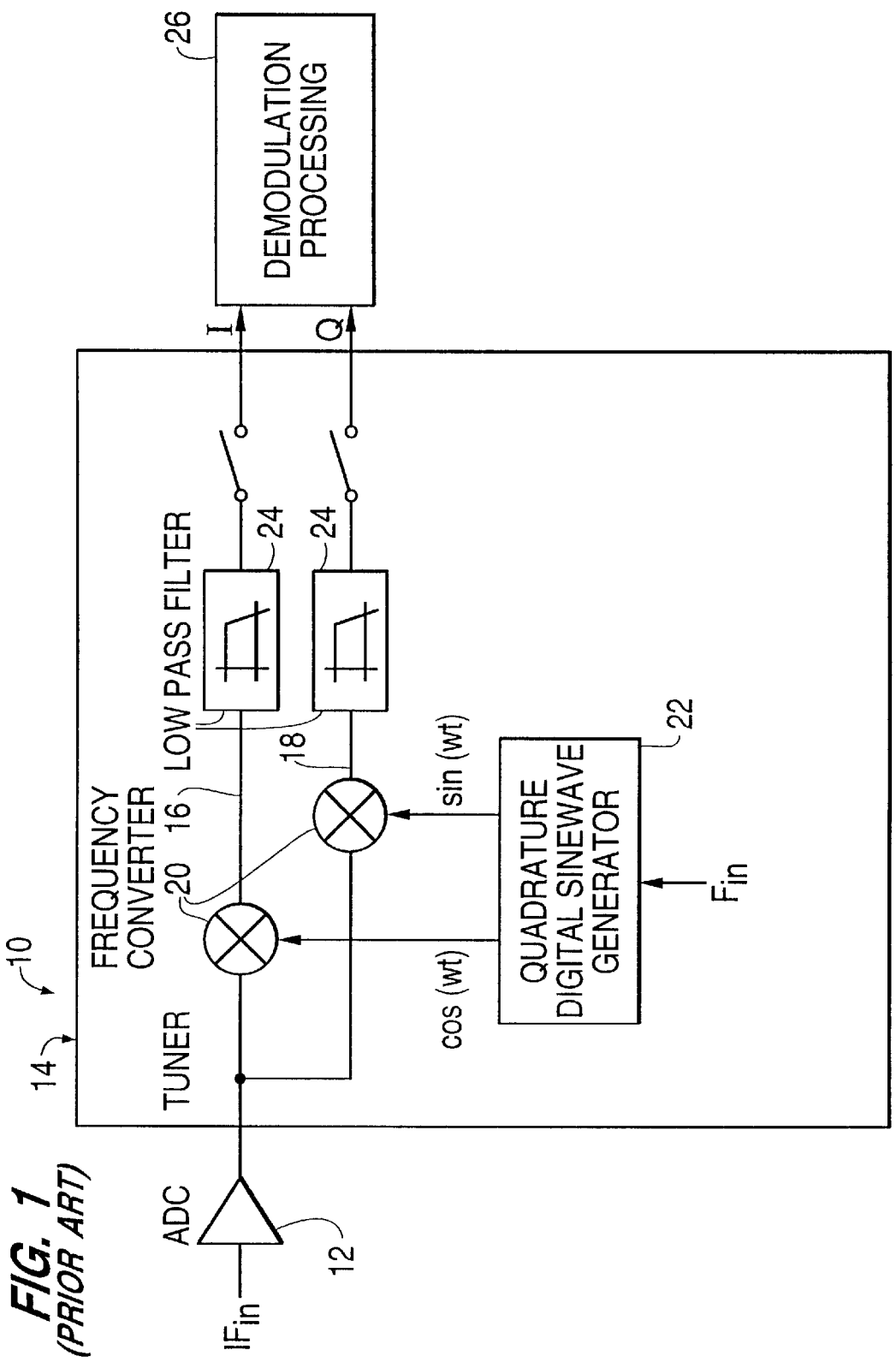
FIG. 1 illustrates a block diagram of a prior art demodulator of a type utilized in a satellite.

FIG. 3 illustrates a first embodiment 50 of a demodulator in accordance with the present invention which differs from the prior art of FIG. 1 by providing a locally generated baseband test data signal which modulates a test carrier frequency which is generated in response to a command causing the quadrature digital sine wave generator 22 to generate quadrature signals COS($\omega t+\theta_m$) and SIN($\omega t+\theta_m$) which are inputted to the frequency converters 20 to produce quadrature carrier frequencies modulated with $\theta_m$ encoded in phase to represent the test data signal. A clamping circuit 52, which in a preferred embodiment is an analog to digital converter, is used to provide a DC reference used as an input to the tuner during testing. If an analog to digital converter is used, it converts the intermediate frequency input signal $IF_{in}$ into a large number of data samples and produces the DC reference signal which is an input to the tuner 54. A control signal BIST is applied to the clamping circuit 52 from the satellite controller 58 which controls the clamping circuit to produce the DC reference during testing of the demodulator. When an analog to digital converter is used as the clamping circuit, the signal BIST controls operation of the analog to digital converter so that during normal data reception, analog to digital conversion of the aforementioned type occurs and during built-in self-testing, the input to the tuner 54 is clamped to a DC reference. The clamping to a DC reference assures that the output signal produced by the frequency converters 20 is not modulated with varying data produced by data reception. A test signal generator 56 produces a test data signal which may be any data pattern, groups of data patterns, or other types of data to be modulated on the I and Q paths 16 and 18 to determine if the downstream demodulator electronics are properly operating. The satellite controller 58 also provides a clock signal CLK at the symbol rate to synchronize the outputting of the phase signal $\theta_m$ from the test signal generator 50 encoding the test data signal. The output of the test signal generator 56 in the preferred application, as illustrated when I and Q data processing paths 16 and 18 are present, is a phase signal $\theta_m$ having four programmable phases 0°, 90°, 180° and 270° respectively encoding 1, +j, −1, −j signal states of the quadrature signals I and Q. A satellite controller 58 controls the application of the BIST signal to enable the clamping circuit 52 and test signal generator 56 to programmably generate its output signal $\theta_m$ of the four programmable discrete phases in accordance with the desired test data signal to be injected into the data processing paths 16 and 18 and also the application of the signal BIST to the clamping circuit 52 to convert it to operation in the test mode.

The tuner 54 is responsive to an input frequency command $F_{in}$ which commands the frequency converters 20 to generate as an output signal either the lower carrier frequency or the test carrier frequency. A phase accumulator 60 responds to the commanded input frequency $F_{in}$, which is related to $\omega$, wherein $$\omega = 2\pi \frac{F_{in}}{\text{Maximum } F_{in}}, F_{in} = \text{Maximum } F_{in} \ (\omega/2\pi),$$

$t=nT_s$ and $T_s=1/f_s$, to select four possible output phases $\theta_m$ which respectively assume the discrete phase of $\omega t$, $\omega t+90°$, $\omega t+180°$, $\omega t+270°$. The phase accumulator 60 may be of any conventional design for combining the programmable phase information $\theta_m$ outputted by the test signal generator 56 with the frequency information inputted by the frequency command $F_{in}$ for controlling the output frequency produced by the frequency converters 20. The output of the phase accumulator 60 is applied to the quadrature digital sine wave generator 22 which outputs two frequencies COS($\omega t+\theta_m$) and sin($\omega t+\theta_m$) with $\theta_m$ being programmed with phases of 0°, 90°, 180° and 270° to encode the test data signal. While not illustrated, the test signal generator 56 is preferably synchronized with the symbol rate of transmission of the quadrature data and may be produced by dividing the main clock of the satellite controller 58 with an integer number but it should be understood that the invention is not limited thereto.

During normal data reception mode, the first embodiment 50 of the demodulator of the present invention operates in accordance with the prior art of FIG. 1 and during testing, operates to shift the test data signal produced by the test data signal generator 56 which is encoded by the discrete phase states of $\theta_m$ to a higher frequency $\omega$ which is used to generate the test carrier frequency during testing of the demodulator. The aforementioned data comparison of the demodulated I and Q data signals with the test data signal produced by the signal generator 56 permits a determination to be made if a malfunction in the demodulator is present.

The first embodiment 50 of the demodulator of the present invention permits built-in self-testing to be achieved, which is especially useful for diagnosing demodulator malfunctions in remote demodulators such as those present in satellites, by the addition of minimal hardware to the tuner design. The test signal generator 56 and the phase accumulator 60 are required to be added to the design of the prior art tuner of FIG. 1 to achieve the functionality of this embodiment. Further, the demodulator processor or processors 62 are modified from the prior art to provide for the additional processing capability to perform the aforementioned comparison which may be implemented by suitable software. The test data signal produced by the test signal generator 56 may be stored therein or provided from the satellite controller 58 to control generation of the test carrier frequency modulated with the test data signal.

FIGS. 4 and 5 illustrate a second embodiment 100 of a demodulator in accordance with the present invention including a digital tuner 101 having a built-in self-test. An analog to digital converter 102 outputs a digitized signal having an extremely high number of samples. The analog to digital converter 102 is responsive to a control signal BIST from a satellite controller 104 to cause the output of the analog to digital converter 102 to be clamped to a DC level in accordance with the function of the clamping circuit 52 described above with regard to the first embodiment 50. The output of the analog to digital converter 102 is applied to the Hilbert transform filter 34 which performs the same function as in FIG. 2. The output of the Hilbert transform filter 34 is applied to a frequency converter 36 which performs the same function as in FIG. 2 during data reception and further produces the test carrier frequency which is subsequently modulated with the test data signal at the frequency shift 106 during testing of the modulator. Digital frequency synthesizer 38 performs the same function during data reception as in FIG. 2 and additionally outputs a digitally synthesized signal causing the frequency converter 36 to output the test frequency carrier frequency which is modulated with the test data signal at the frequency shift 106 during testing of the modulator. The digitally synthesized sinusoidal signals produced by the digital frequency synthesizer are applied to the frequency converter 36 which, during data reception, shifts the output of the Hilbert transform filter 34 to a lower carrier frequency, as commanded by the FREQUENCY CONTROL WORD 103. The use of the FREQUENCY CONTROL WORD 103 differs from its use in FIG. 2 in that it additionally commands generation of the digitally synthesized signal, which causes the test carrier frequency to be generated by the frequency converter 36, which is modulated downstream by the test data signal by the frequency shift 106 as is described hereinafter. The FREQUENCY CONTROL WORD 103 during normal data reception generates a digitally synthesized signal which causes the lower carrier frequency to be outputted by the frequency converter 36 and during testing of the demodulator specifies the generation of a digitally synthesized signal which causes the test carrier frequency to be generated by the frequency converter 36. The output of the frequency converter 36 is applied to the down sampler 42 which performs the same function as described above in conjunction with FIG. 2. The output of the down sampler 42 is applied to the frequency shift 106 which is responsive to a frequency shift controller and test signal generator 105 which applies control signals, SWITCH RAILS, NEGATE Q, and NEGATE I, as described below. During reception of data, the aforementioned control signals are used to generate multipliers described above in the order +1, +j, −1, and −j, at the sampling rate $F_s$ to provide the requisite frequency shift $F_s/4$ to align the channels for downstream channelization as described above.

During testing of the demodulator, application of the combination of the control symbols, as described above in FIG. 2, produces a programmable and variable sequence of possible outputs +1, +j, −1, and −j, at the symbol rate. These outputs encode the test data signal. The resultant programmable outputs at the data symbol rate, which may be selected and programmed to be any one of +1, +j, −1 and −j, represent a phase modulation of the test carrier frequency at programmable phase angles respectively of 0°, 90°, 180° and 270° which permit the test data signal to be encoded like the embodiment of FIG. 3. Unlike data reception in FIG. 2, the order of the outputs from the frequency shift 106 for providing phase modulation encoding the test data signal is not fixed.

Figure 2:
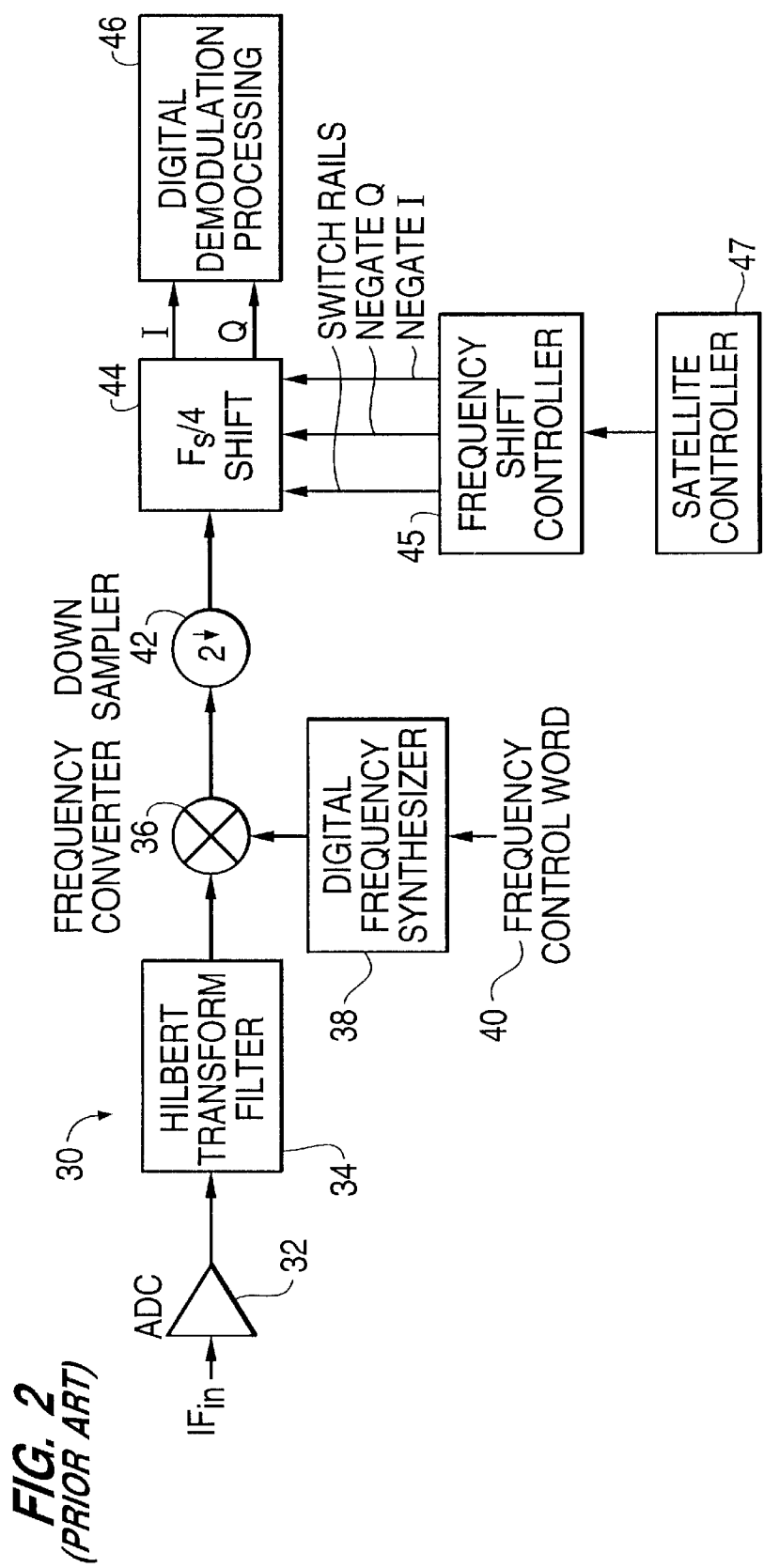
FIG. 2 illustrates a block diagram of a preferred embodiment of a demodulator containing a digital tuner used with the practice of the present invention utilized in a satellite.

FIG. 5 illustrates a block diagram of the frequency shift 106 used in FIG. 2 to perform the requisite frequency shift during normal data reception and the phase modulation of the test carrier frequency during demodulator testing which is provided by the present invention. The difference between the operation of the frequency shift 106 during demodulator testing and normal data demodulation is that, during demodulator testing, it operates as a phase modulator while, during data reception, frequency shifting is produced. During phase modulation, changing of the programmable states +1, +j, −1 and −j occurs at the symbol rate with the order of the outputs being programmable to output a desired test data signal. During data demodulation, only a frequency shift occurs. The order of the multiplication is fixed during data demodulation. The commands which control the output of the I and Q data signals are under the control of "NEGATE I, NEGATE Q and SWITCH RAILS" which are respectively applied to multiplexers 108, 110 and switch 112. Inverter 114 is an input to multiplexer 108 to provide for the negation of the I input signal in response to the NEGATE I command. Inverter 116 is an input to the multiplexer 110 to provide for inversion of Q input signal in response to the NEGATE Q signal.

The difference between the embodiments of FIG. 3 and FIGS. 4 and 5 is that digital tuning is utilized in the embodiment of FIGS. 4 and 5 and further that the modulation of the test carrier signal by the test data signal is produced at different portions of the I and Q processing paths contained in the tuners thereof. However, both embodiments provide for built-in self-testing utilizing the upward shifting of a test data signal from baseband injected into the I and Q data channels of the tuner to determine if a demodulator malfunction is present. However, it should be understood that the present invention is fully applicable to M-ary data processing as disclosed in the embodiment of FIG. 3 and FIGS. 4 and 5.

While the invention has been described in terms of its preferred embodiments, it should be understood that numerous modifications may be made thereto without departing from the spirit and scope of the invention as defined in the appended claims. It is intended that all such modifications of the invention fall within the scope of the appended claims.

What is claimed is:

1. A demodulator comprising:

an input signal source having an output which during data reception is a data signal and which during testing of the demodulator is a reference signal;

a tuner having a tuner input coupled to the output of the input signal source and a tuner output, the tuner including a frequency converter which frequency shifts the data signal to a lower carrier frequency during data reception to cause the tuner to output at the tuner output the lower carrier frequency modulated with the data signal and which upwardly frequency shifts the reference signal to a test carrier frequency during the testing of the demodulator; and a test data source which applies a test data signal to the tuner during the testing to cause the tuner to output at the tuner output the test carrier frequency modulated with the test data signal; and wherein, the input signal source is an analog to digital converter, the analog to digital converter producing the reference signal at the output of the input signal source which is a DC signal in response to a test command and producing a digitized output of the data signal when the test command is not present at the analog to digital converter.

2. A demodulator in accordance with claim 1 wherein:

the test data signal is coupled to the frequency converter to produce the test carrier frequency modulated with the test data signal.

3. A demodulator in accordance with claim 2 further comprising:

a quadrature digital sinewave generator, coupled to the frequency converter, which is responsive to a frequency command to cause the frequency converter during data reception to produce I and Q quadrature carriers modulated with the data signal at a commanded lower carrier frequency and to cause the frequency converter during testing of the demodulator to produce commanded I and Q quadrature carriers at the test carrier frequency; and wherein the test data source is coupled to the quadrature digital sinewave generator.

4. A demodulator in accordance with claim 3 further comprising:

a phase generator, coupled to the test data source, which outputs a phase signal to the quadrature digital sinewave generator, producing discrete phases which are programmable with the programmable phases encoding signal states of I and Q test data signals which are stored by the test data source and modulated on the test carrier frequency.

5. A demodulator in accordance with claim 4 further comprising:
   a clock signal generator which outputs to the test data source a clock signal at a data symbol rate of the I and Q test data signals to control a rate at which states of the test data signal are generated; and wherein
   the phase signal is a baseband phase signal.
6. A demodulator in accordance with claim 1 wherein:
   the test data signal is coupled to the frequency converter to produce the test carrier frequency modulated with the test data signal.
7. A demodulator in accordance with claim 6 further comprising:
   a quadrature digital sinewave generator, coupled to the frequency converter, which is responsive to a frequency command to cause the frequency converter during data reception to produce I and Q quadrature carriers modulated with the data signal at a commanded lower carrier frequency and to cause the frequency converter during testing of the demodulator to produce commanded I and Q quadrature carriers at the test carrier frequency commanded; and wherein
   the test data source is coupled to the quadrature digital sinewave generator.
8. A demodulator in accordance with claim 7 further comprising:
   a phase generator, coupled to the test data source, which outputs a phase signal to the quadrature digital sinewave generator, producing discrete phases which are programmable with programmable phases encoding signal states of I and Q test data signals which are stored by the test data source and modulated on the test carrier frequency.
9. A demodulator in accordance with claim 8 further comprising:
   a clock signal generator which outputs to the test data source a clock signal at a data symbol rate of the I and Q test data signals to control a rate at which states of the test data signal are generated; and wherein
   the phase signal is a baseband phase signal.
10. A demodulator in accordance with claim 1 further comprising:
    a digital frequency synthesizer, coupled to the frequency converter, which is responsive to a frequency command to produce a digitally synthesized test carrier frequency; and wherein
    a test signal generator modulates a signal, which is coupled to an output of the frequency converter, with the test data signal to produce the test carrier frequency modulated with the test data signal.
11. A demodulator in accordance with claim 10 further comprising:
    a frequency shift means, coupled to the output of the frequency converter, which in response to the test data signal shifts the signal coupled to the output of the frequency converter in phase to produce a phase shifted output at the output of the tuner with the phase shifted output being modulated by discrete phases with each phase representing one of an I or Q signal state of the test data signal during testing.
12. A demodulator in accordance with claim 11 wherein:
    a frequency shift produced by the frequency shift means is one quarter of a data sampling rate of data inputted to the frequency shift means during data reception and modulates the test carrier in phase at a data symbol rate of I and Q data when the test data signal is inputted to the frequency shift means.
13. A demodulator in accordance with claim 12 further comprising:
    a filter having a filter input coupled to the output of the input signal source, and a filter output coupled to the frequency converter, the filter attenuating half of a spectrum of the data signal and converting real data of the output of the input signal source into complex data having real and imaginary components; and
    a down sampler having a down sampler input coupled to an output of the frequency converter and an output, coupled to the frequency shift means, the down sampler reducing a number of samples in the data signal by a factor of two which are contained in the output of the frequency converter.
14. A demodulator in accordance with claim 1 further comprising:
    a digital frequency synthesizer, coupled to the frequency converter, which is responsive to a frequency command to produce a digitally synthesized test carrier frequency; and wherein
    a test signal generator modulates a signal, which is coupled to an output of the frequency converter, with the test data signal to produce the test carrier frequency modulated with the test data signal.
15. A demodulator in accordance with claim 14 further comprising:
    a frequency shift means, coupled to the output of the frequency converter, which in response to the test data signal shifts the signal coupled to the output of the frequency converter in phase to produce a phase shifted output at the output of the tuner with the phase shifted output being modulated by discrete phases with each phase representing one of an I or Q signal state of the test data signal during testing.
16. A demodulator in accordance with claim 15 wherein:
    a frequency shift produced by the frequency shift means is one quarter of a data sampling rate of data inputted to the frequency shift means during data reception and modulates the test carrier in phase at a data symbol rate of I and Q data when the test data signal is inputted to the frequency shift means.
17. A demodulator in accordance with claim 16 further comprising:
    a filter having a filter input coupled to the output of the input signal source, and a filter output coupled to the frequency converter, the filter attenuating half of a spectrum of the data signal and converting real data of the output of the input signal source into complex data having real and imaginary components; and
    a down sampler having a down sampler input coupled to an output of the frequency converter and an output, coupled to the frequency shift means, the down sampler reducing a number of samples in the data signal by a factor of two which are contained in the output of the frequency converter.
18. A demodulator in accordance with claim 1 wherein:
    the demodulator is located in a satellite.
19. A data demodulator in accordance with claim 1 further comprising:
    a processing device, coupled to the output of the tuner, which compares a demodulated test data signal with the test data signal which modulated the test carrier frequency with a difference between the demodulated test data signal which modulated the test carrier frequency and the test data signal indicating a malfunction in the demodulator.

20. A method of data reception and testing of a demodulator comprising:

providing an input signal which is a data signal during the data reception and which is a reference signal during the testing of the demodulator;

operating a frequency converter within a tuner of the demodulator to shift in frequency the data signal to a lower carrier frequency during data reception and to frequency shift the reference signal upwardly to a test carrier frequency during testing of the demodulator; and applying a test data signal to the tuner during the testing to cause the tuner to output the test carrier frequency modulated with the test data signal; and wherein the reference signal is a DC signal which is produced in response to a test command applied to an analog to digital converter which is coupled to an input of the tuner; and the analog to digital converter produces a digitized output of the data signal which is applied to an input of the tuner during reception of the data signal.

21. A method in accordance with claim 20 wherein:

the test data signal is coupled to the frequency converter to produce the test carrier frequency modulated with the test signal.

22. A method in accordance with claim 21 wherein:

a quadrature digital sinewave generator is coupled to the frequency converter and is responsive to frequency commands to cause the frequency converter to produce commanded I and Q quadrature carriers at the test carrier frequency; and wherein the test data source is coupled to the quadrature sinewave generator.

23. A method in accordance with claim 22 further comprising:

applying a phase signal having a plurality of discrete phases, which are programmable with the phases representing signal states of the I and Q test data signals modulated on the test carrier frequency, to the quadrature digital sinewave generator.

24. A method in accordance with claim 23 further comprising:

producing a clock signal to at a data symbol rate of the I and Q data signals; and controlling a rate of generation of the phase signal to be synchronous with the clock signal; and wherein the phase signal is a baseband signal.

25. A method in accordance with claim 20 wherein:

the test data signal is coupled to the frequency converter to produce the test carrier frequency modulated with the test signal.

26. A method in accordance with claim 25 wherein:

a quadrature digital sinewave generator is coupled to the frequency converter and is responsive to frequency commands to cause the frequency converter to produce commanded I and Q quadrature carriers at the test carrier frequency; and wherein the test data source is coupled to the quadrature sinewave generator.

27. A method in accordance with claim 26 further comprising:

applying a phase signal having a plurality of discrete phases which are programmable with the phases representing signal states of the I and Q test data signals modulated on the test carrier frequency to the quadrature digital sinewave generator.

28. A method in accordance with claim 27 further comprising:

producing a clock signal to at a data symbol rate of the I and Q data signals; and controlling a rate of generation of the phase signal to be synchronous with the clock signal; and wherein the phase signal is a baseband signal.

29. A method in accordance with claim 20 further comprising:

coupling a digitally synthesized test carrier frequency to the frequency converter; and a signal, which is coupled to an output of the frequency converter, is modulated with the test data signal to produce the test carrier frequency modulated with the test data signal.

30. A method in accordance with claim 29 wherein:

the signal, coupled to the output of the frequency converter, is shifted in phase by a frequency shift to produce a phase shifted output at an output of the tuner with the phase shifted output being modulated by discrete phases with each phase representing one of an I or Q signal state of the test data signal during testing.

31. A method in accordance with claim 30 wherein:

a frequency shift produced by the frequency shift means is one quarter of a data sampling rate of data inputted to the frequency shift means during data reception and modulates the test carrier in phase at a data symbol rate of I and Q data when the test data signal is inputted to the frequency shift means.

32. A method in accordance with claim 31 further comprising:

attenuating half of a data spectrum of the data signal and converting real data of the data spectrum into complex data containing real and imaginary components which is coupled to an input of the frequency converter;

down sampling an output of the frequency converter by a factor of two to produce a down sampled output; and frequency shifting the down sampled output.

33. A method in accordance with claim 20 further comprising:

coupling a digitally synthesized test carrier frequency to the frequency converter; and a signal, which is coupled to an output of the frequency converter, is modulated with the test data signal to produce the test carrier frequency modulated with the test data signal.

34. A method in accordance with claim 33 wherein:

the signal, coupled to the output of the frequency converter, is shifted in phase by a frequency shift means to produce a phase shifted output at an output of the tuner with the phase shifted output being modulated by discrete phases with each phase representing one of an I or Q signal state of the test data signal during testing.

35. A method in accordance with claim 34 wherein:

the frequency shift produced by the frequency shift means is one quarter of a data sampling rate of data inputted to the frequency shift means during data reception and modulates the test carrier in phase at a data symbol rate of I and Q data when the test data signal is inputted to the frequency shift means.

36. A method in accordance with claim 35 further comprising:
- attenuating half of a data spectrum of the data signal and converting real data of the data spectrum into complex data containing real and imaginary components which is coupled to an input of the frequency converter;
- down sampling an output of the frequency converter by a factor of two to produce a down sampled output; and
- frequency shifting the down sampled output.

37. A method in accordance with claim 20 further comprising:
- comparing a demodulated test data signal with the test data signal used to modulate the test carrier frequency with a difference between the demodulated test data signal and the test data signal used to modulate the test carrier wave indicating a malfunction in the demodulator.

* * * * *